United States Patent [19]

Moriya

[11] Patent Number: 4,664,930
[45] Date of Patent: May 12, 1987

[54] PROCESS FOR MANUFACTURE OF SOYBEAN CURD

[76] Inventor: Isao Moriya, 29, Aoyama 1-chrome, Midori-ku, Nagoya-shi, Aichi, Japan

[21] Appl. No.: 790,767

[22] Filed: Oct. 23, 1985

Related U.S. Application Data

[63] Continuation of Ser. No. 552,476, Nov. 16, 1983, abandoned.

[51] Int. Cl.$^4$ ................................................ A23L 1/20
[52] U.S. Cl. ..................................... 426/573; 426/404; 426/515; 426/634
[58] Field of Search ............... 426/573, 629, 634, 460, 426/404, 46, 515, 601, 602, 537

[56] References Cited

U.S. PATENT DOCUMENTS

| | | | |
|---|---|---|---|
| 1,195,843 | 8/1916 | Murakami | 426/634 |
| 3,982,025 | 9/1976 | Hashimoto et al. | 426/46 |
| 4,080,477 | 3/1978 | Tsumura et al. | 426/46 |
| 4,147,811 | 4/1979 | Abe | 426/634 |

FOREIGN PATENT DOCUMENTS

| | | | |
|---|---|---|---|
| 0115840 | 10/1978 | Japan | 426/629 |
| 56-39866 | of 1981 | Japan | |
| 0039866 | 9/1981 | Japan | 426/634 |

*Primary Examiner*—Robert Yoncoskie
*Assistant Examiner*—Marianne M. Cintins
*Attorney, Agent, or Firm*—Birch, Stewart, Kolasch & Birch

[57] ABSTRACT

A process for the manufacture of soybean curd is disclosed. The steps comprise: (a) intensely agitating prepared soybean milk to such an extent that a homogenized colloidal state thereof is produced in which contained soybean protein is homogeneously dispersed and also contained soybean fat is homogeneously emulsified; (b) adding magnesium chloride to the soybean milk to obtain a mixture thereof; (c) again intensely agitating the obtained mixture to such an extent that the added magnesium chloride is instantaneously dispersed throughout the soybean milk; (d) stopping flowing of the mixture immediately after the preceding step (c); and (e) leaving the mixture to form a coagulated gel.

8 Claims, No Drawings

PROCESS FOR MANUFACTURE OF SOYBEAN CURD

This application is a continuation of application Ser. No. 552,476 filed Nov. 16, 1983 now abandoned.

BACKGROUND OF THE INVENTION

This invention relates to the manufacture of soybean curd, and more praticularly to an improved process for the manufacture of soybean curd such as the type called "tofu" in Japan.

The soybean curd called "tofu" is one of the typical Japanese foods, which has been widely used since old times and is currently very popular in Japan. Also, in the United States, European and other countries, the soybean curd has come to be regarded as an attractive food because it contains high quality protein and is available at a low price.

The soybean curd now available in the markets under the name of "tofu" (excluding such special ones as those baked, frozen and dried, or fried) may be roughly classified into four types, that is, "momen tofu" (which substantially means a cotton strained tofu), "kinugoshi tofu" (which substantially means a tofu having silky body surfaces), "soft tofu", and "packed tofu".

The type called "momen tofu" is generally manufactured by putting prepared crushed soybean milk gel into an open-top, perforated mold vessel having its perforated walls internally covered with a water-permeable cotton cloth (cotton gauze) and then molding the same in the vessel into a mass by applying an adjusted pressure thereupon, whereby surplus water flows out through the cotton cloth as well as the perforated walls, and thus is removed from the vessel. Finally, the obtained mass is cooled and then cut into a desired number of cubic pieces which are final products. The "momen tofu" thus produced is generally lower in water content than any one of the other three types of "tofu".

The type called "kinugoshi tofu" is generally manufactured by pouring prepared soybean milk into an open-top, non-perforated mold vessel and then mixing it in the vessel with a coagulant into a coagulated mass, without dewatering. The obtained mass is cooled and then cut into a desired number of cubic pieces which are final products. Because of the lack of dewatering, the "kinugoshi tofu" is more watery and softer than the "momen tofu" and has very smooth and silky body surfaces while being very easily broken into pieces.

The type called "soft tofu", which is a relatively modern type of "tofu", is generally manufactured by pouring prepared soybean milk into an open-top, perforated mold vessel having its perforated walls internally covered with a water-permeable cotton cloth together with an overlapping, water-impermeable sheet made of synthetic resin, and then mixing it with a coagulant to effect coagulation. When the resultant mixture is coagulated to a certain extent, the water impermeable sheet is removed, so that a certain amount of water contained in the mixture flows out through the water-permeable cotton cloth as well as the perforated walls and thus is removed from the vessel. Then, the coagulation is continued to its full extent under an adjusted pressure, until a desired, fully coagulated mass is obtained. Finally, the obtained mass is cooled and then cut into a desired number of cubic pieces which are final products. The "soft tofu" this produced has intermediate properties between those of the "momen tofu" and those of the "kinugoshi tofu".

The type called "packed tofu", which is also a relatively modern type of "tofu", is generally manufactured by pouring prepared soybean milk (preferably cooled down to about 4°–15° C.) together with an added coagulant into a given number of film-made cubic containers, vacuum-packing the soybean milk in the containers, heating the same into a coagulated gel, and then cooling down the same after full coagulation, whereby vacuum-packed final products are obtained.

As apparent from the above description, the four types of soybean curd are somewhat different from one another in the process of manufacture. However, it is common to all of the four types of soybean curd that prepared soybean milk is coagulated into a gel by means of a coagulant.

As such a coagulant, calcium sulfate is now most extensively used for the current mass production of the aforedescribed four types of soybean curd, while, in some cases, gulco-delta-lactone and calcium chloride are also used for the same purpose.

On the other hand, it is well known in the field to fee manufacture invention that natural bittern (magnesium chloride) was used as the coagulant many years ago. It is also well known that it is theoretically possible to produce commercially valuable soybean curd which is quite excellent in flavor, adequately soft and elastic, very good in taste, mouth feel, body texture, and surface luster, provided that bittern is used as the coagulant under certain proper conditions.

Nevertheless, no one knows the details as to how and under what conditions bittern was added to soybean milk in such old days. In fact, it has proved technically very difficult to use bittern (magnesium chloride) as the coagulant for the manufacture of soybean curd on a mass production scale, because magnesium chloride contained in the bittern reacts so quickly with soybean milk into local or heterogeneous coagulation, as compared to any one of the currently used coagulants such as calcium sulfate, gluco-delta-lactone and calcium chloride, resulting in the produced soybean curd often being too hard, not uniform in quality, poor in water retention, and/or dissatisfactory in surface luster, body texture and mouth feel. In other words, it is considered the use of bittern (magnesium chloride) as the coagulant is always accompanied by high skill and accumulated experience, which is a fatal disadvantage in the manufacture of soybean curd on a mass production scale under an automatic system at a low manufacturing cost. This is why the above-mentioned calcium sulfate, gluco-delta-lactone and calcium chloride have taken the place of bittern (magnesium chloride) as the coagulant in the current manufacture of soybean curd on a mass production scale.

However, it is clear that none of the above-mentioned, currently used coagulants can exceed bittern (magnesium chloride) from the viewpoint producing high quality of products which taste good. In addition thereto, it is presumed that calcium sulfate (55–120 mg of calcium sulfate is generally contained per 100 g of product soybean curd) is not good for the health of human beings. Further, in the case where the above-mentioned currently used coagulants are employed, dispersing of seasonings such as soy sauce into a product body has proved to be relatively poor as compared to the case where magnesium chloride is employed.

Therefore, various attempts have been made to produce good-tasting, high quality soybean curd by using magnesium chloride as the coagulant, as disclosed, for example, in Japanese Patent Publication No. 56-39866, published Sept. 16, 1981 (Patent Application No. 53-48253, filed Apr. 21, 1978, Seiich KUBOTA as Inventor and Applicant). This prior art is concerned with an improved process for manufacturing the two types of soybean curd called "kinugoshi tofu" and "soft tofu" by using magnesium chloride as the coagulant. More particularly, this prior art method comprises the steps of: (1) pouring prepared soybean milk into an agitating bath and producing a certain flow (preferably one way flow) of the soybean milk in the bath; (2) adding magnesium chloride to the flowing soybean milk (6–9 g of $MgCl_2$ in powder or aqueous solution/1 l of soybean milk) to obtain a flowing state of mixture thereof; (3) transferring the obtained mixture into a mold vessel and then leaving the same for about one hour until a coagulated mass is produced; and (4) pouring a prepared, heated aqueous solution of 40% $MgCl_2$ over the coagulated mass.

This prior art method, however, is disadvantageous in the following points: the first disadvantage being that the method is not applicable to manufacture of soybean curd of the type called "momen tofu" because the process for the "momen tofu" requires such particular steps of crushing a coagulated gel of the mixture of soybean milk and the added magnesium chloride and then transferring the resulted crushed gel into a perforated mold vessel for molding the same into a mass under pressure. The second disadvantage being that local or heterogeneous coagulation of a mixture of soybean milk and the added magnesium chloride is inevitably invited because the coagulating reaction of the magnesium chloride with the soybean milk is excessively accelerated when the mixture thereof is in the continued flowing state. The third disadvantage being that manufacturing efficiency is poor because the method requires such a step of leaving the resulted mixture for about one hour in the mold vessel. The fourth disadvantage being that it is considered that, if as much as 6–9 g of $MgCl_2$ is added per 1 l of the flowing soybean milk, the resultant mixture is likely coagulate before it is transferred into the mold vessel. Thus, this prior art method may often be unpractical for the manufacture of the desired good-tasting, high quality soybean curd on a mass production scale.

SUMMARY OF THE INVENTION

It is, therefore, an object of the present invention to substantially reduce the above discussed disadvantages inherent to the prior art methods for the manufacture of soybean curd on a mass production scale in which calcium sulfate, gluco-delta-lactone, or calcium chloride is used as a coagulant.

Another object of the invention is to provide an improved, efficient process for the manufacture of good-tasting, high quality soybean curd on a mass production scale, which permits use of magnesium chloride or bittern as a coagulant, without high skill and accumulated experience.

A further object of the invention is to provide an improved, efficient process for the manufacture of good-tasting, commercially valuable soybean curd on an automatic, mass production scale, which permits use of magnesium chloride or bittern as a coagulant, under minimized disadvantageous influence by such particular conditions as soaking time and temperature for material soybeans, conditions for grinding the soaked soybeans into soybean paste, and/or heating time and temperature for the soybean paste.

According to the present invention, there is provided a process for the manufacture of soybean curd, which comprises in combination the steps of: (a) intensely agitating a given quantity of soybean milk having a predetermined solids content, in an agitating bath, to such an extent that a homogenized colloidal state thereof is produced in which contained soybean protein is homogeneously dispersed and also contained soybean fat is homogeneously emulsified: (b) adding a predetermined quantity of magnesium chloride or bittern as a coagulant to the soybean milk to obtain a mixture thereof; (c) again intensely agitating the obtained mixture for at most six seconds, preferably 2–4 seconds, immediately after the preceding steps (b), to such an extent that the added coagulant is instantaneously dispersed throughout the soybean milk; (d) stopping the flow of the mixture to substantially a standstill immediately after the preceding step (c), for deferring commencement of coagulating reaction of the soybean milk with the added coagulant as well as for minimizing development of undesirable local or heterogeneous coagulation; and (e) leaving the mixture to coagulate into a gel, wherein the added coagulant, i.e., magnesium chloride or bittern, may be of any one of such forms as powder, granule, or solution thereof. The solution may contain edible oil and/or fat, phospholipid, and/or emulsifying agents admixed therewith. In addition to the above steps (a) to (e), one or more further steps may be added in accordance with types of soybean curd as desired.

One feature of the invention resides in that the homogeneously emulsified soybean lipid (fat) contained in the soybean milk serves to restrict an instantaneous coagulating reaction of the soybean milk (soybean protein) with the added magnesium chloride, so that the reaction time thereof becomes slightly slower to such an extent that the added magnesium chloride is permitted to become well dispersed throughout the soybean milk before commencement of the coagulating reaction.

Another feature of the invention resides in that commencement of the coagulating reaction of the soybean milk (soybean protein) with the added magnesium chloride can be intentionally deferred, within a certain limited time, by adding an adjusted quantity of well emulsified edible oil or fat premixed with a prepared aqueous solution of magnesium chloride to be added later to the soybean milk.

A further feature of the invention resides in that the homogeneous dispersion of the soybean protein contained in the soybean milk serves to reduce local or heterogeneous coagulation of the soybean protein, conditioned that commencement of the coagulating reaction of the added magnesium chloride with the soybean milk can be intentionally deferred.

Further, it is a presumption by the Inventor that magnesium chloride dissolved in soybean milk may have such a specific property that serves to maintain a homogenized colloidal state of the soybean milk and a good dispersion not only of the contained soybean protein, soybean fat lipid (fat) and other original contents in the soybean milk but also of secondarily added additives such as flavoring additives, edible oil or fat, and an emulsifying agent, and that this specific property may more or less contribute to the unexpectedly good results obtained by the process according to the invention.

It is also a presumption by the Inventor that (1) the above discussed specific property of the dissolved magnesium chloride, (2) the above discussed intentionally deferred commencement of the coagulating reaction of the soybean milk with the added magnesium chloride, and (3) the homogeneous dispersion of the soybean protein in the soybean milk are all important factors to the success of the present invention.

An advantage of the invention is that the product soybean curd is good in taste, acceptable in mouth feel, flavor, surface luster, body texture, and mellowness, and uniform in quality.

Another advantage of the invention is that the process is applicable to the manufacture of any one of the four types of soybean curd, namely, "momen tofu", "kinugoshi tofu", "soft tofu", and "packed tofu", by simply providing one or more additional steps to the process.

A further advantage of the invention is that it permits production of good-tasting and nutritions soybean curd enriched with an added edible oil or fat.

A still further advantage of the invention is that it permits production of good-tasting, commercially valuable soy bean curd flavored with an added flavoring additive or additives.

Other objects, features and advantages of the invention will become apparent from the following detailed description.

DETAILED DESCRIPTION OF THE PREFERRED EMBODIMENTS

The soybean milk (hydrophilic sol of soybean protein) used in the process of the present invention may be prepared in accordance with any of the conventional methods. For instance, the soybean milk may be prepared in the following steps:

(A) soaking material soybeans in water to soften them;
(B) grinding the softened soybeans into soybean paste called "go", with water and an anti-foaming agent added thereto;
(C) heating the obtained soybean paste with added water by boiling or by blowing hot water vapor thereinto (at this step, the greater part of the soybean protein becomes soluble in water); and
(D) leaching or filtering the heated soybean paste by means of a known residue separator equipped with perforated sheet metals or a known filtering cloth bag to remove solid residue comprised of hulls, fibers and other insoluble contents called "okara"; and
(E) the juicy portion obtained after removal of the residue from the soybean paste is a desired soybean milk in which soybean protein, soybean lipid (fat), soybean phospholipid, non-fibrous carbohydrates, minerals, and water are contained.

The soybean milk thus prepared is adjusted in a storing tank to have a solids content in the range of 11–14 wt.% and a protein content in the range of 5–7 wt.%, preferably 5.5–6.5 wt.%.

A given quantity of the prepared soybean milk, having its solids and protein contents adjusted, is transferred, for example under vacuum, from the storing tank into an agitating bath, and intensely agitated in the bath by means of a known agitating blade or the like to produce a homogenized colloidal state thereof in which the contained soybean protein is homogeneously dispersed and also the contained soybean lipid (fat) is homogeneously emulsified. It is considered that the homogeneous dispersion of the protein substantially serves to reduce local or heterogeneous coagulation thereof. It is also considered that the phospholipid contained in the soybean milk serves as an emulsifying agent acting upon the soybean fat.

Then, a predetermined quantity of magnesium chloride, preferably about 2–4 g/1000 g of soybean milk, is added to the soybean milk to obtain a mixture thereof. The relative dosing quantity of magnesium chloride may preferably be decreased as the used soybean milk is relatively increased in quantity. The magnesium chloride may be of powder, granule, or aqueous solution thereof. The magnesium chloride may also be in the form of that contained in natural bittern.

If desired, the aqueous solution of magnesium chloride may additionally include an edible oil or fat, phospholipid and/or a known emulsifying agent, for example glyceride, admixed therewith in desired proportions. As the edible oil or fat, various kinds of vegetable and animal oils and fats, such as soybean oil, corn oil, palm oil, coconut oil, rape oil, butter, lard, tallow and others, are available. The phospholipid and the emulsifying agent cooperate to emulsify the added edible oil or fat. By adjusting the quantity of the emulsified fat and/or oil, commencement of the coagulating reaction of the added magnesium chloride with the soybean milk (soybean protein) can be intentionally deferred within a certain limited time.

Further, if desired, one or more of flavoring additives, such as dried and powdered green laver or sea tangle, sesame seeds, honey or other, may be added to the soybean milk together with the magnesium chloride. Otherwise, the flavoring additive, for example honey, may be pre-mixed with the aqueous solution of magnesium chloride.

Immediately after the preceding step, the obtained mixture of the soybean milk and added coagulant (magnesium chloride) is again agitated intensely to such an extent that the added coagulant is instantaneously dispersed throughout the soybean milk, and then flowing of the mixture, caused by the agitation, is quickly stopped substantially to a standstill for deferring commencement of coagulating reaction of the soybean milk with the added magnesium chloride and also for minimizing development of undesirable local or heterogeneous coagulation thereof. This flow-stopping may be performed, for example, by instantaneously stopping the agitating blade in the agitating bath or otherwise by inserting a stopper blade into the flow of the mixture. Thereafter, the mixture is matured into coagulated gel.

The above steps are common to the manufacture of all four types of soybean curd, that is, "momen tofu", "kinugoshi tofu", "soft tofu" and "packed tofu". However, one or more additional steps are required in accordance with the types of soybean curd as desired.

In the manufacture of the type called "momen tofu", the coagulated gel formed in the preceding step is crushed and then the obtained crushed gel is transferred into an open-top, perforated mold vessel having its perforated walls internally covered with a water-permeable cotton cloth. Then, the crushed gel is molded in the vessel into a mass by applying an adjusted pressure thereupon, whereby surplus water is removed through the cotton cloth and the perforated walls. As a final step, the obtained mass is cooled and then cut into a desired number of cubic pieces which are final products.

In the manufacture of the type called "soft tofu", the mixture of the soybean milk and the added magnesium chloride is transferred, immediately after the preceding flow-stopping step, into an open-top, perforated mold vessel having its perforated walls internally covered with a water-permeable cotton cloth together with an overlapping, water impermeable sheet. After the transferred mixture is coagulated into a gel, the water impermeable sheet is removed from the mold vessel and then an adjusted pressure is applied upon the the resulted gel so that a certain quantity of water contained in the gel is removed through the cotton cloth and the perforated walls. As a final step, the obtained mass is cooled and then cut into a desired number of cubic pieces which are final products.

In the manufacture of the type called "kinugoshi tofu", the mixture of the soybean milk and the added magnesium chloride is transferred, immediately after the preceding flow-stopping step, into an open-top, non-perforated mold vessel, and then the mixture is matured into a coagulated mass in the vessel, without any dewatering. The obtained coagulated mass is cooled and then cut into a desired number of cubic pieces which are final products.

In the manufacture of the type called "packed tofu", the mixture of the soybean milk and the added magnesium chloride, cooled to about 4°–25° C., is poured into and vacuum-packed in each of a desired number of film-made cubic containers immediately after the preceding flow-stopping step. The mixture is coagulated into a gel in each of the containers under a heating condition, and then cooled after full coagulation, whereby vacuum-packed final products are obtained.

EXAMPLE I

"momen tofu"

100 g of a mixture, which is comprised of 74.7 wt.% hot water, 25 wt.% soybean oil, 0.2 wt.% phospholipid, 0.05 wt.% glyceride as an emulsifying agent, and 0.05 wt.% carragheenin (irish moss extractive) as a stabilizer, is mixed with 40 g of powdered magnesium chloride by means of a known mixer in order to prepare a stabilized aqueous solution of the magnesium chloride containing well emulsified soybean oil.

12,500 g of prepared soybean milk, having a temperature of about 80° C. and a solids content of 12.5–13.0 wt.%, is poured into a round-shaped agitating bath and intensely agitaed in the bath to produced a homogenized colloidal state thereof. Then, the above prepared solution is added to the soybean milk and the resulted liquid mixture is intensely agitated for 2–4 seconds. Then, flowing of the mixture is quickly stopped for minimizing development of local or heterogeneous coagulation thereof. After leaving the mixture for about 20 minutes to form a coagulated gel, the resultant gel is crushed and then transferred into an open-top, perforated mold vessel for molding the same in the vessel into a mass by applying an adjusted pressure thereupon. The obtained mass is cooled and then cut into twenty-five cubic pieces of lipid-enriched and good-tasting final products each weighing about 450 g. The obtained product has a rupture strength of 49.3 g/cm$^2$, while a typical conventional "momen tofu" has that of 70 g/cm$^2$. This means that the product according to the invention is adequately soft.

EXAMPLE II

"soft tofu"

12,000 g of prepared soybean milk having a temperature of about 80° C. and a solids content of about 13 wt.% is poured into a round-shaped agitating bath and intensely agitated in the bath to produce a homogenized colloidal state thereof. Then, 42 g of powdered magnesium chloride is added to the soybean milk to obtain a mixture thereof, and the resultant mixture is intensely agitated for 2–4 seconds, and then flowing of the mixture, caused by the agitation, is quickly stopped. Immediately thereafter, the mixture is rapidly transferred into an open-top, perforated mold vessel having its perforated walls internally covered with a water-permeable cotton cloth together with an overlapping, water impermeable sheet. After leaving the mixture for about 20 minutes to form a coagulated gel, the water impermeable sheet is removed from the vessel, so that a certain quantity of water contained in the gel is removed through the cotton cloth and the perforated walls.

As a final step, the obtained coagulated mass is cooled down and then cut into twenty-five cubic pieces of final products each weighing 450 g. The obtained product has 6.3 wt.% protein, 3.7 wt.% lipid (fat), and tastes very good.

EXAMPLE III

"kinugoshi tofu"

11,250 g of prepared soybean milk, having a temperature of about 80° C. and a solid content of about 13 wt.%, is poured into a round-shaped agitating bath and intensely agitated in the bath to produce a homogenized colloidal state thereof. Then, 40 g of solid bittern is added to the soybean milk, and the resultant mixture is intensely agitated for 2–4 seconds. Then, flowing of the mixture, caused by the agitation, is quickly stopped. Immediately thereafter, the mixture is rapidly transferred into an open-top, non-perforated mold vessel. After leaving the mixture for about 20 minutes to form a coagulated mass, the resultant mass is cooled down and then cut into twenty-five cubic pieces of final products each weighing 450 g and tasting very good.

EXAMPLE IV

"packed tofu"

12,000 g of prepared soybean milk, cooled down to about 10° C. and having a solids content of about 13 wt.%, is poured into a round-shaped agitating bath and intensely agitated in the bath to produce a homogenized colloidal state thereof. Then, 42 g of magnesium chloride in granule is added to the soybean milk and intensely agitated for 2–4 seconds, and then flowing of the mixture, caused by the agitation, is quickly stopped. Immediately thereafter, 150 g of the mixture is poured into and vacuum-packed in each of seventy-five film-made cubic containers. Then, each of the resultant packed mixtures is coagulated under heated condition. After coagulation, the packed mixtures are cooled down to obtain seventy-five of vacuum-packed final products each weighing about 150 g and tasting very good.

EXAMPLE V

"Kinogoshi tofu" flavored with green laver

Under the same operating conditions as in the above Example III, 8 g of dried green layer is powder is admixed to the prepared soybean milk at the step where the magnesium chloride in the form of solid bittern is added to the soybean milk. The obtained products are well flavored with the added green laver and taste very good.

COMPARISON TEST

The following table shows the results of an organoleptic test by twenty adults, in which the mark "very good" means that positive approvals were given by more than 18 persons out of 20; the mark "good" means that positive approvals were given by more than 12 persons but less than 17 persons; the mark "ordinary" means that positive approvals when in the range of 7-11 persons; the mark "poor" means that positive approvals were in the range of 5-6 persons; aand the mark "very poor" means that positive approvals remained less than 4 persons.

TABLE

| Used Coagulant | Properties of Product | | | | | |
|---|---|---|---|---|---|---|
| | Taste | Mouth Feel | Hardness $(g/cm^2)$ | Surface Luster | Body Texture | Seasoning Spreadability into Body |
| Currently used coagulant (calcium sulfate, or gulco-delta-lactone, or calcium chloride) | poor | ordinary | 30~100 | good | good | poor |
| Magnesium chloride applied substantially in the same manner as of the above currently used coagulant | ordinary | poor | 150~200 | poor | very poor | good |
| Magnesium chloride in powder or granule applied according to the present invention | good | good | 70~120 | good | good | good |
| Magnesium chloride applied in aqueous solution according to the present invention | very good | very good | 50~100 | very good | very good | good |

The present invention being thus described, it will be obvious that same may be varied in many ways. Such variations are not to be reagrded as a departure from the spirit and scope of the invention, and all such modifications as would be obvious to those skilled in the art are intended to be included within the scope of the preent invention.

I claim:

1. A process for manufacture of soybean curd, which comprises in combination steps of:
   (a) homogenizing a a fat contained soybean milk having 11-14 weight % solids content and 5-7 weight % soybean protein in such a manner that a homogenized colloidal state thereof is produced;
   (b) adding an emulsified aqueous solution which comprises 2-4 g of magnesium chloride per 1000 g of said soybean milk, an edible oil and an emulsifying agent to said soybean milk to obtain an uncoagulated mixture thereof, and wherein said emulsified edible oil is in an amount sufficient to defer the commencement of a coagulating reaction of said soybean milk with said magnesium chloride;
   (c) again homogenizing the obtained mixture for two to six seconds, immediately after step (b), in such a manner that the added magnesium chloride is instantaneously dispersed throughout said soybean milk;
   (d) stopping the flow of said mixture to substantially a standstill immediately after step (c) and before commencement of coagulating reaction of said soybean milk with said magnesium chloride; and
   (e) leaving said mixture to form a coagulated gel.

2. The process as defined in claim 1, wherein said process further includes additional steps of:
   crushing said coagulated gel;
   transferring the obtained crushed gel into a perforated mold vessel having its perforated walls internally covered with a water-permeable cloth; and
   molding the same into a mass by applying an adjusted pressure thereon.

3. The process as claimed in claim 1, wherein said process further includes additional steps of:
   rapidly transferring said homogenized mixture of step (c) into a perforated mold vessel having its perforated walls internally covered with a water-permeable cloth together with a water impermeable sheet, immediately after step (d); and
   step (e) is carried out in said perforated mold vessel wherein said water impermeable sheet is removed.

4. The process as defined in claim 1, wherein said process further includes an additional step of rapidly transferring said homogenized mixture of step (c) into a non-perforated mold vessel immediately after step (d); and
   step (e) is carried out in said nonperforated mold vessel.

5. The process as defined in claim 1, wherein said process further includes an additional step of pouring said mixture and vacuum-packing in containers immediately after step (d).

6. The process as defined in claim 1, wherein said magnesium chloride is added in the form of bittern.

7. The process as defined in claim 1, wherein said solution further comprises a flavoring additive.

8. The process as defined in claim 1, wherein said homogenizing in step (c) is conducted for 2-4 seconds.

* * * * *